J. G. LEAL.
AUTOMATIC GUIDING DEVICE FOR HARROWS.
APPLICATION FILED JAN. 30, 1913.
1,109,076.
Patented Sept. 1, 1914.
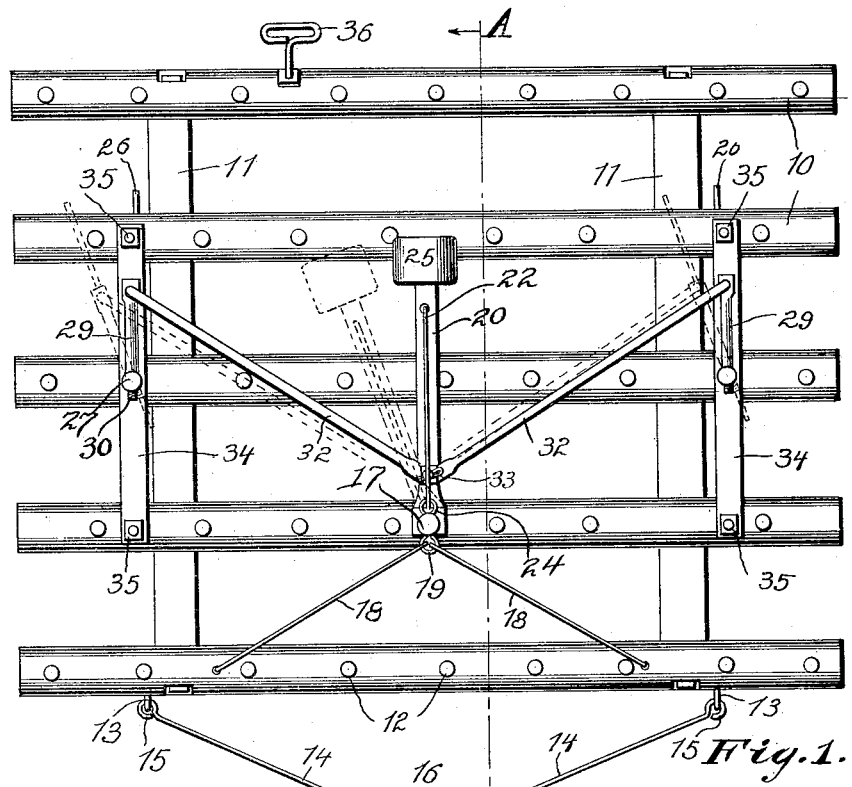
Fig. 1.
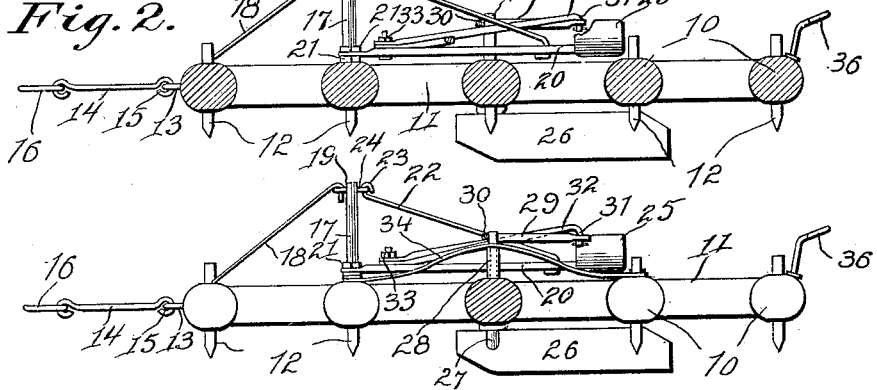
Fig. 2.
Fig. 3.
Witnesses:
Inventor:
Jesse G. Leal,
his attorney.

UNITED STATES PATENT OFFICE.

JESSE G. LEAL, OF BAKERSFIELD, CALIFORNIA.

AUTOMATIC GUIDING DEVICE FOR HARROWS.

1,109,076.  Specification of Letters Patent.  Patented Sept. 1, 1914.

Application filed January 30, 1913. Serial No. 745,295.

*To all whom it may concern:*

Be it known that I, JESSE G. LEAL, a citizen of the United States, residing at Bakersfield, in the county of Kern and State of California, have invented new and useful Improvements in Automatic Guiding Devices for Harrows, of which the following is a specification.

My present invention relates to the class of harrow attachments, and the object thereof is to automatically direct the harrow on side hills, so that the same will fall directly behind the horses or propelling power in such a manner as though the harrow were being used on level ground, that is in such a way as to keep the back part of the harrow from swerving down the hill.

The device provided can be attached to an ordinary plow and when used upon an incline, the device, as above stated, will keep the harrow in proper position so that the ground will be as evenly and properly harrowed as though it were level; also keeping the harrow directly behind the horses or propelling power, and in the case of horses will prevent their being injured by the tugs or traces.

This invention more specifically relates to an automatic device to be attached to each section of a harrow, the same consisting of parallel knives or sheets of metal, built somewhat on the order of a sled runner. The front portion of each of the guides is attached to the lower part of the frame work of the harrow by a pivot bolt, so that they cut the ground similarly to a harrow tooth. The guiding elements are so attached by rods and levers as to constantly attain correct parallelism, the rods and levers being connected upon the harrow to a pivoted bar, one end of which is swingingly mounted, as apparent. This swinging end is provided adjacent its extremity with a weight element of sufficient weight and size to automatically swing the said guiding contrivances, such as occasion may demand.

With the above and other objects in view, my invention relates to such details of construction, and in the arrangement and combination of parts as will hereinafter be fully described, and more specifically pointed out in the appended claims.

In describing my invention in detail, reference will be had to the accompanying drawings wherein like characters denote like or corresponding parts throughout the several views, and in which;

Figure 1 is a plan view of my invention, illustrating the guiding elements in full and dotted lines. Fig. 2 is a sectional view of the device, as taken upon lines A—A of the Fig. 1. Fig. 3 is a side elevation of the device, illustrating parts thereof in section.

Referring now more particularly to the drawings, wherein is shown a preferred embodiment of my invention, the numeral 10 designates a series of transversely parallel alined, spaced apart harrow bars, the same being secured adjacent their respective extremities through the medium of the cross members 11. With this construction in view, it is apparent that the rigidity of the harrow bars is assured, thus providing a substantially rigid frame work, which in itself is very essential to the complete and efficient operation of a device of this character. Each of the harrow bars before mentioned, is provided about its longitudinal axis with a multiplicity of vertically disposed teeth 12 which provide the absolutely essential engaging surface by which the clods of dirt are completely disintegrated.

Eyelets 13, which are horizontally alined are provided upon the forwardmost harrow bar in close proximity to its respective extremities. Rods, such as designated at 14, are swingingly carried by the before mentioned eyelets, the rear extremities thereof being curved, as shown at 15, for engagement therewith while their forward ends are connected to an engaging element 16, as shown; consequently allowing suitable propelling mechanism to be securely connected thereto. A vertically disposed post 17 is provided upon one of the bars 10, preferably at a medial portion in relation to its respective extremities, this post being secured in a rigid position by any suitable or adaptable means. For preventing dislodgment of the post, and thus assuring its rigidity in relation to its component elements, a pair of angularly disposed brace rods 18 are provided, the latter having connection at their lower extremities to the forward of the harrow bars, while their upper ends have engagement with an eyelet 19 carried upon the post, as clearly shown. Attention is called to the peculiar angular disposition of the brace rods. When in this position, it is apparent that the rigidity of the post is assured, in view of the fact that the same can not move either laterally or longitudinally. The brace rods in themselves are constructed preferably of a strong non-resilient material, consequently preventing all movement whatsoever of the posts. A bar 20 is movably mounted upon the post 17, between the securing elements 21, so that it may have a horizontal, oscillatory movement between certain of the projecting portions of the harrow teeth 12. A third brace rod 22 has connection with this bar in close proximity to its outward extremity, while its other end is bent, as shown at 23, for engagement with an eyelet 24 of the usual form provided with the upper end of the post 17. This last mentioned rod not only adds to the assurity of the rigid position of the post 17, but also prevents any vertical movement of the bar 20; thus it will be comprehended that the latter is normally held movable in a horizontal plane.

Contingent from and carried by the bar 20, adjacent its outermost point, is a weight element 25 embodying a degree of compactness sufficient to operate certain guiding elements against the resistance of a plowed surface, while the frame work of the device is disposed at an angle. This element 25 may be secured about the bar in any desired or adaptable manner, but it is apparent that its disposition, as shown in the drawings, is preferable, in view of the fact that the further the same is disposed from the post, its degree of equation will be greater.

The guiding elements, before termed, consist essentially of a pair of elongated plates 26 carrying near one end, upstanding pintles 27 which extend vertically through sleeves 28 carried upon one of the bars 10, as shown, and consequently hold the plates in movable relation with the remaining structure of the device. Connecting arms 29 have connection with the upper ends of the pintles 27, as shown at 30, the outer extremities of said arms, however, being provided with suitable vertically extending openings for reception of the downwardly turned ends 31 of the connecting rods 32. While one end of the connecting rods has engagement with the connecting arms 29, their other or inner ends are secured upon the bar 20, as shown at 33, adjacent its connection with the post 17.

The connecting arms 29, as well as the connecting rods 32, may be constructed from any desired material other than wood; however, they should embody sufficient strength to communicate movement of the weighted arm 20 to the guiding rods of the device.

It has been shown, from actual practice, that means have to be provided for assuring the rigidity of the pintles 27 above the upper extremities of the sleeves 28. With this in view, transverse, metallic strengthening strands 34 are employed, an intermediate portion of which is disposed over the adjacent pintle, while their respective extremities are secured to the contiguous bars 10 by such means as shown at 35. It might be added, that the provision of the strengthening strands not only holds the pintles 27 in a rigid position, but also prevents the dislodgment of the sleeves 28, such as may be occasioned by constant jarring of the device.

As clearly illustrated in the drawings, a handle portion 36 is provided upon the harrow 10, consequently enabling the operator to change the course of the device whenever desirable. This form of handle is merely shown for the sake of illustration, and therefore it is apparent that any other type can be employed, if it is desired.

In the operation of my improved harrow, from the construction elucidated above, the parts of the device are normally disposed in the position shown at Fig. 1 of the drawings. If the harrow travels upon a side hill to the right thereof, the frame work will be disposed at an angle corresponding to that of the hill and will, of course, normally tend to swerve down the hill, as before pointed out. However, when the frame assumes this position, the weight will move according to gravity to assume the position shown in dotted lines in Fig. 1, whereby the plates 26 will be disposed at an angle corresponding in degree to that assumed by the rod 20, consequently guiding the harrow always up the hill and allowing the same to normally attain a position directly behind the horses, or other propelling power.

The advantages resultant from the use of my invention will be readily educed by those who are conversant with the crude and unsatisfactory devices heretofore employed in this art.

Such changes as are permissible by the sub-joined claims may be resorted to without departing from the spirit of my invention.

Having thus fully described my invention, what I claim as new and desire to secure by Letters Patent, is:

1. In a device of the character described, the combination with a harrow of a series of runners movably mounted thereon and automatic means for actuating the movement of said runners, as and for the purpose set forth and described.

2. In a device of the character described, the combination with a harrow of a series of runners movably mounted thereon, and a weighted element provided upon said harrow for actuating the movement of said runners, as and for the purpose set forth and described.

3. In a device of the character described, the combination with a harrow of a series of runners movably mounted thereon, a weighted bar movably mounted upon said harrow and means connecting said bar and said runners, substantially as described.

4. In a device of the character described, the combination with a harrow of a pair of runners movably mounted thereon, a weighted bar movably mounted upon said harrow, means connecting said bar at one of its ends with said runners, substantially as described.

5. In a device of the character described, the combination with a harrow of a pair of runners movably mounted thereon, a post provided upon said harrow, a bar movably mounted upon said post adjacent its lower extremity, a weight carried upon said bar near its outer end, means connecting said bar and said runners, whereby the movement of said bar will be imparted to said runners, substantially as described.

6. In a device of the character described, the combination with a harrow of a series of runners movably mounted upon the underside thereof, a weighted element movably mounted upon the upper-side of said harrow, means connecting said weighted element and said runners, substantially as described.

JESSE G. LEAL.

Witnesses:
 WALTER OSBORN,
 ALFRED BOYLE.

---

Copies of this patent may be obtained for five cents each, by addressing the "Commissioner of Patents, Washington, D. C."